United States Patent [19]

Zweifel

[11] Patent Number: 4,893,245

[45] Date of Patent: Jan. 9, 1990

[54] WINDSHEAR GUIDANCE FOR AIRCRAFT HAVING INERTIAL SENSOR

[75] Inventor: Terry L. Zweifel, Phoenix, Ariz.

[73] Assignee: Honeywell Inc., Minneapolis, Minn.

[21] Appl. No.: 141,752

[22] Filed: Jan. 11, 1988

[51] Int. Cl.$^4$ .............................................. G06F 15/50
[52] U.S. Cl. ................................... 364/435; 244/181; 340/966
[58] Field of Search ...................... 364/434, 427, 428; 340/968; 244/181, 180, 183

[56] References Cited

U.S. PATENT DOCUMENTS

| | | | |
|---|---|---|---|
| 3,791,208 | 2/1974 | Miller | 73/180 |
| 4,261,537 | 4/1981 | Tisdale, Sr. et al. | 364/434 X |
| 4,373,184 | 2/1983 | Lambregts | 364/434 |
| 4,536,843 | 8/1985 | Lambregts | 364/434 |
| 4,593,285 | 6/1986 | Miller et al. | 340/968 |
| 4,608,641 | 8/1986 | Snell | 364/434 |
| 4,725,811 | 2/1988 | Muller et al. | 340/968 |
| 4,728,951 | 3/1988 | Johnson et al. | 340/968 |
| 4,797,674 | 1/1989 | Zweifel et al. | 340/968 |

Primary Examiner—Parshotam S. Lall
Assistant Examiner—Thomas G. Black
Attorney, Agent, or Firm—Arnold L. Albin

[57] ABSTRACT

An aircraft guidance system for flying an optimal inertial flight path in a windshear encounter. Zero inertial flight path angle command is utilized as the basis for guidance commands for either horizontal or vertical windshears; the flight path angle command is constant regardless of the actual magnitude of the shear. The effect of the guidance law described is to provide a zero inertial flight path angle to prolong excitation of the aircraft's phugoid oscillatory mode. By utilizing inertial flight path angle derived from an inertial reference system, errors introduced by vertical gyroscope systems are eliminated and thus a very accurate flight path angle guidance law is produced. The described guidance control law maximizes the aircraft's time in the air during a windshear encounter. Protection against aircraft stall is also provided by using a computed variable maximum allowable angle of attack.

10 Claims, 3 Drawing Sheets

WINDSHEAR GUIDANCE FOR AIRCRAFT HAVING INERTIAL SENSOR

BACKGROUND OF THE INVENTION

1. Field of the Invention

The present invention relates to the generation of commands applied to a flight director or automatic pilot system for guiding an aircraft to exit a windshear encounter, and more particularly to control the flight path of an aircraft equipped with an inertial platform system in an optimal manner.

2. Description of the Prior Art

The phenomenon of windshear can pose a serious threat to the safety of aircraft and in fact is considered directly responsible for several aircraft accidents, the most recent being the crash of an L-1011 aircraft at Dallas, Texas, on Aug. 2, 1985. Windshear can be defined as a rapidly changing horizontal wind or steady vertical wind, whose effect on the aircraft is to cause large speed or altitude deviations from normal flight. Windshear, either in itself or as a result of attempts by the human pilot to restore the aircraft to its normal flight path, can cause the aircraft to stall or crash.

In the prior art, the detection and guidance provided during a windshear encounter would cause the aircraft to fly at some fixed speed, usually slightly greater than stall speed. The speed commanded was usually a speed known as stick shaker speed, approximately five percent greater than stall speed, and is the speed where artificial means are used to vibrate the control column or stick to warn the human pilot of impending stall. Stick shaker speed is generally considered to be the minimum speed for safe flight. Corresponding to stick shaker speed is a stick shaker angle of attack which is generally considered to be the maximum allowable angle of attack for safe flight of the aircraft.

As many commercial transport aircraft, general aviation aircraft, and military aircraft are equipped with a flight director system whereby pitch command signals may be displayed to the human pilot the guidance command for windshear encounter is usually presented as a displacement of the pitch command bar. When the human pilot maneuvers the aircraft in such a manner as to reduce the displacement to null, he has assured that the aircraft is at the required pitch angle to satisfy the guidance command. In addition, many aircraft are also equipped with an automatic pilot system which can be used to manipulate the elevator control surface of an aircraft in order to respond to a predetermined guidance control law, such as one which might be used to command the aircraft to the optimum flight path in the event of a windshear encounter. Furthermore, many modern aircraft are equipped with inertial platform systems, used primarily for navigation, which are capable of measuring the flight path angle of the aircraft relative to the ground in an accurate manner. Inertial navigation is a method for determining the position and velocity of an aircraft by measuring its acceleration and processing the acceleration information in a computer. Its indications of position and velocity are substantially independent of vehicle maneuvers and completely self-contained since it is based on measurements made within the aircraft itself.

A shortcoming of the prior art is that the commanded fixed speed or angle of attack may result in the aircraft flying at the minimum safe speed when the magnitude and duration of the windshear do not in fact require such a maneuver. In addition, a command to fly at the maximum angle of attack can cause the excitation of a long period, poorly damped oscillation of the aircraft known as the phugoid mode. Excitation of this mode can result in the aircraft crashing even after the windshear condition has disappeared. Consequently, prior art systems could in fact create dangerous situations wherein the aircraft will crash even in the presence of a relatively low magnitude shear.

In pending application Ser. No. 834 729, now U.S. Pat. No. 4,797,674 assigned to the assignee of the present invention, sensed longitudinal and vertical components of windshear and angle of attack are combined to generate a command to reduce the aircraft's true airspeed at a rate proportional to the magnitude of the encountered windshear. This scheme effectively minimized the flight path angle change in a shear encounter and provided better guidance commands, but did not adequately take into account the long term phugoid mode oscillations of the aircraft.

A further prior art guidance apparatus is disclosed in applicant's pending application Ser. No. 920,402, now FWC 07/198,602, also assigned to the assignee of the present invention, wherein actual flight path angle derived from a vertical gyroscope is combined with angle of attack to generate a predetermined flight path angle. A command was generated that produced an optimal flight path angle relative to the earth, but suffered from inaccuracies in the measuring devices, specifically in the input parameters of pitch angle and angle of attack. Pitch angle is typically derived from a vertical gyroscope aboard the aircraft and is subject to well-known measurement errors in accelerated flight. Specifically, the actual pitch angle may differ by as much as two degrees from the measured value due to gyroscope erection to a false vertical caused by acceleration or deceleration of the aircraft's speed relative to the ground. In this case, the gyroscope erection circuitry senses the vector sum of the gravitational vector and the acceleration vector and missaligns the gyro along the vector direction.

In addition to the pitch angle error, errors can be introduced by the angle of attack probe. The angle of attack of an aircraft is a basic parameter of flight extremely useful in the guidance and control of an aircraft. Angle of attack is generally measured by probes or vanes protruding from the outside surface of the aircraft. Angle of attack probe errors can be caused by tolerances in alignment procedures which typically allow plus or minus 0.5 degrees. Consequently, an error of 0.5 degree can occur in the angle of attack measurement. In the worst case the flight path angle computed from pitch angle measurement minus the angle of attack measurement can produce errors in the desired flight path angle of plus or minus 2.5 degrees. These errors are sufficient to result in significantly degraded performance in a windshear encounter.

The present invention overcomes the limitations of the prior art by providing a guidance command that not only effectively minimizes the excitation of the aircraft's phugoid mode but also is not prone to the above-mentioned measurement errors. The invention will maximize the time the aircraft remains in the air and distance traveled, regardless of the magnitude of the windshear or whether the winds are horizontal, vertical or a combination of the two. By utilizing outputs from an on-board inertial platform system, angle of attack errors are eliminated and pitch angle errors are held to a minimum, thus allowing the automatic pilot or human pilot to fly the aircraft along the optimum flight path angle more accurately and easily. The state of the art in inertial platform systems is such as to provide inertial flight path angle measurements with accuracies of plus or minus 0.25 degrees.

SUMMARY OF THE INVENTION

The present invention provides guidance commands to the human pilot or automatic pilot system in a windshear encounter so that the resultant flight path of the aircraft maximizes the aircraft's time in the air and distance traveled. This is accomplished by commanding an optimal flight path angle and using inertial flight path angle supplied by an inertial platform system as the feedback term. In addition, angle of attack protection is provided to preclude commanding angles of attack near stall. Whenever the inertial flight path angle is zero or greater, the maximum allowed angle of attack is stick shaker angle of attack minus a predetermined amount. If the inertial flight path angle becomes negative, indicating the aircraft is descending toward the ground, the maximum allowed angle of attack is increased as a function of the inertial flight path angle until the allowed angle of attack is stick shaker angle of attack. In this way, flight at stick shaker angle of attack is only permitted to preclude imminent ground impact.

In the present invention, the sensed inertial flight path angle from an inertial navigation system is combined with a flight path angle signal which has been determined to provide an optimum flight path in the presence of a windshear condition to derive an error signal for commanding the desired angle of attack. Where the aircraft is flying at or below the maximum allowable angle of attack, the error signal is applied to a flight director instrument for normal control of the flight path by the human pilot, or to an autopilot for automatic control of the elevators in a conventional closed loop fashion. When the aircraft is flying above the maximum allowable angle of attack so as to exhibit a negative flight path angle, the error signal is processed through a limiter responsive to actual angle of attack and stick shaker angle of attack to allow the angle of attack to increase to stick shaker angle of attack. The combination of the above-mentioned functions serves to produce a guidance command that results in the optimal flight path angle with minimal system errors, while providing protection against stalling the aircraft by limiting the maximum allowable angle of attack.

DESCRIPTION OF THE PREFERRED EMBODIMENTS

Before discussing the present invention in detail, it is useful to discuss the underlying physical principles of the effect of a windshear on an aircraft. Windshear poses the greatest threat to the aircraft in the take off and landing regimes of flight when the aircraft is typically flying at relatively low speeds and is also near the ground. The two most dangerous types of windshear are the tail windshear and the down burst. The former is a wind that varies with time and blows in the direction of aircraft motion; the latter is a constant wind that blows towards the ground.

The tail windshear tends to reduce the aircraft's true airspeed and thus extracts kinetic energy from the aircraft relative to the air mass. As the aircraft's true airspeed begins to decrease, the inherent natural speed stability of the aircraft will attempt to regain the lost speed by exchanging potential energy for kinetic energy. The loss of potential energy, however, means loss of altitude, and if the exchange is not controlled adequately by the human pilot or automatic pilot, the aircraft may lose sufficient altitude to cause ground impact. The inherent natural energy exchange may be reduced by pulling the nose of the aircraft up (thereby increasing the aircraft's angle of attack and lift) using the elevator control surface. This, however, will allow more speed loss and if unchecked can result in the aircraft stalling and subsequent crash.

Figure 1:
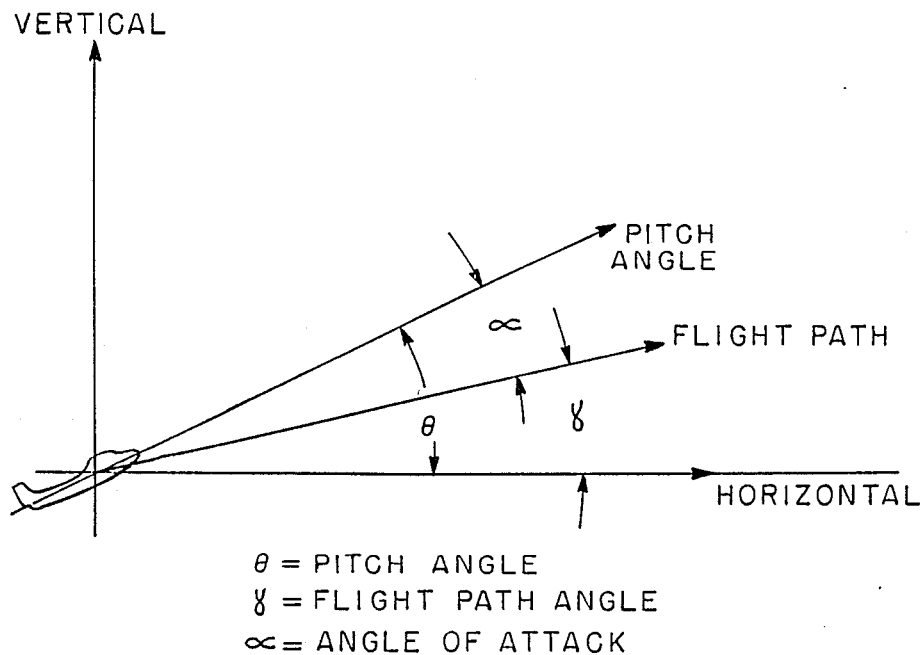
FIG. 1 is a diagram illustrating parameters of interest in the flight of an aircraft useful in explaining operation of the invention.

FIG. 1 illustrates the geometric orientation of the applicable flight parameters. The attitude of the longitudinal axis of the aircraft is represented by the pitch angle $\theta$. The flight path angle, represented by $\gamma$, is the angle between the aircraft's inertial velocity vector and the local horizontal plane. The angle between the inertial velocity vector and the longitudinal axis of the aircraft is the angle of attack of the aircraft, designated $\alpha$. The pitch angle and flight path angle are measured in vertical planes which are orthogonal to the ground plane.

The aircraft will stall if its angle of attack exceeds a known value that is a function of the aircraft's flap position. Consequently, the pilot is constrained in his control by a maximum angle of attack which is necessarily less than the angle of attack at which stall will occur. This angle of attack is known as the stick shaker angle of attack and is representative of the angle of attack at which maximum lift can be achieved for safe flight. At stick shaker angle of attack, a mechanical system is employed to vibrate the control column to warn the human pilot that he is approaching stall angle of attack.

The situation is complicated further by an oscillatory mode of the aircraft known as the phugoid mode. The phugoid mode is characterized by flight at essentially constant angle of attack. During the phugoid oscillations, the aircraft will exchange kinetic and potential energy. These exchanges result in airspeed gains and losses accompanied by altitude losses and gains. If the oscillations are of sufficient magnitude, the aircraft may impact with the ground during a cycle of the oscillation. Hence, if the human pilot or automatic pilot system should achieve and maintain stick shaker angle of attack during a tail windshear encounter, the phugoid oscillation can be excited and the aircraft will begin to oscillate in altitude. As mentioned, if the amplitude of the altitude oscillation is sufficiently large, the aircraft will crash.

Unfortunately, if the magnitude and duration of the encountered windshear are sufficient, the pilot will eventually be forced to go to the stick shaker angle of attack to keep the aircraft aloft. Once this fixed angle of attack has been achieved, phugoid oscillation will begin and the aircraft will begin descending toward the ground. At this point the human pilot or automatic pilot is virtually helpless. The angle of attack cannot be increased to develop more lift since the aircraft will stall; conversely, pushing the aircraft's nose down will simply result in an increased rate of descent toward the ground. It is obvious then that increasing the angle of attack of the aircraft to stick shaker should only be done when absolutely necessary to preclude striking the ground.

From the above discussion, it will be seen that an optimal guidance law for use by the human pilot or an automatic pilot system must provide the best possible utilization of the aircraft's available energy to maintain flight for as long as possible while also minimizing excitation of the aircraft's phugoid mode.

A purely downward flowing vertical wind also has a deleterious effect on the aircraft. The effect is to reduce the aircraft's flight path angle relative to the ground. If the flight path angle is negative, the aircraft will descend, and if uncorrected, will eventually crash.

It is now appropriate to discuss in detail how the present invention deals with the phenomena mentioned above to provide the human pilot or automatic pilot system with guidance commands to produce the optimal flight path angle for encounters with windshears.

In the event of a tail windshear encounter, it is desirable for the reasons stated previously to minimize excitation of the aircraft's phugoid mode while maintaining a non-negative flight path angle. It is well-known that a method of minimizing excitation of the phugoid mode is to either minimize the altitude change or speed change resultant from the oscillation. As minimizing the speed change can result in negative flight path angles relative to the horizontal, the minimization can only be done practically by minimizing the altitude change. This can be done by flying the aircraft at zero flight path angle relative to the ground, or, more precisely, by flying an inertial flight path angle equal to zero.

Figure 2:
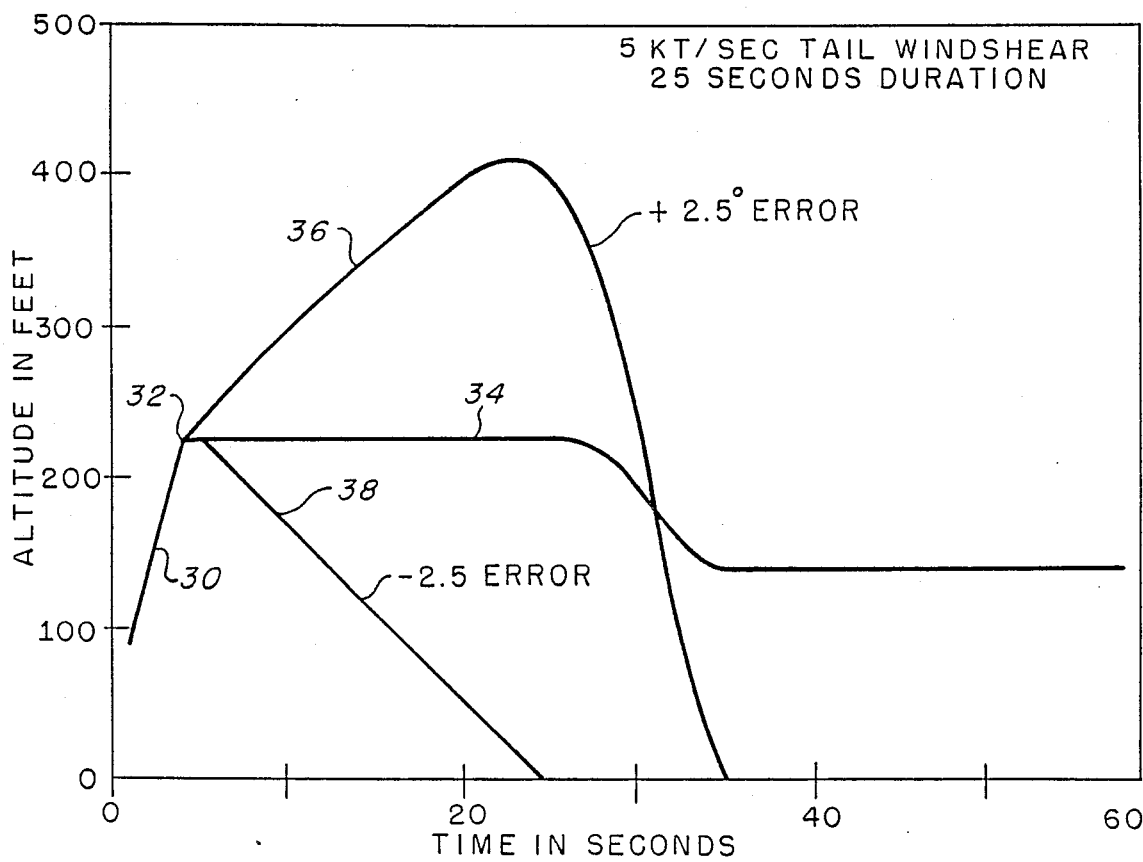
FIG. 2 is a graphical representation of a time history of the flight path of an aircraft as a function of various flight path angle sensing systems for a windshear of infinite duration.

FIG. 2 illustrates the advantage of using an inertial flight path angle derived from an inertial platform system as compared to systems using pitch angle and angle of attack to derive flight path angle. In this simulated windshear encounter, a tail windshear of 5 knots per second is encountered at point 10. The windshear is of infinite duration so that the aircraft cannot escape. While an infinite windshear does not in fact exist in nature, the model serves as a reference to determine maximum time in the air. The ordinate axis 12 of the Figure represents altitude above the ground measured in feet while the abscissa 14 represents elapsed time measured in seconds. Line segment 16 illustrates the flight path of the aircraft before the windshear encounter at point 10.

Line 18 illustrates the flight path of the present invention which utilizes inertial flight path angle derived from an inertial platform system. Line 20 illustrates the flight path of a system which utilizes pitch angle and angle of attack and in which the measurement errors have accumulated to produce an error 2.5 degrees greater than the true inertial flight path angle. Line segment 22 illustrates a system which utilizes pitch angle and angle of attack in which the accumulated measurement errors produce an error 2.5 degrees less than the true inertial flight path angle. It can be clearly seen that the present invention results in maintaining the aircraft in the air for the longest time for this hypothetical example.

Figure 3:
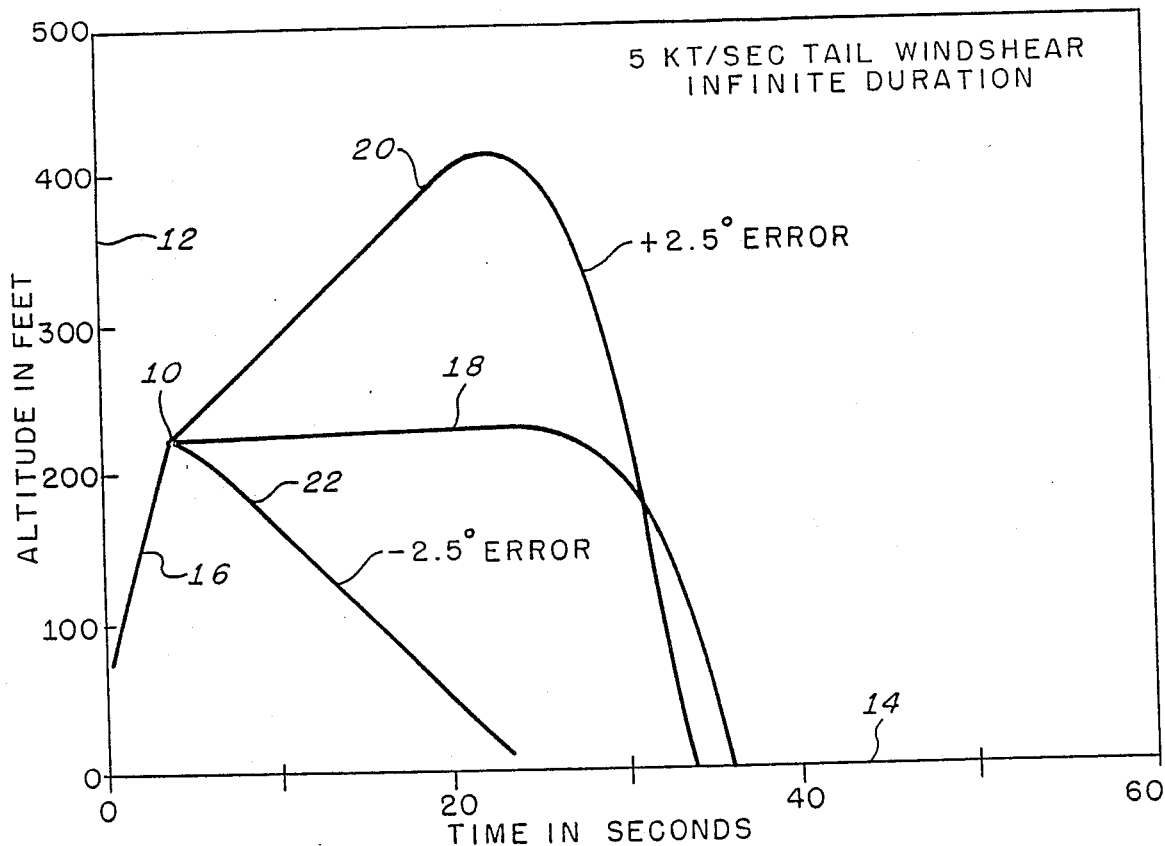
FIG. 3 is a further time history for a windshear of fixed duration illustrating the flight path commanded by the present invention compared to other guidance schemes.

The importance of flying an accurate inertial flight path angle can be seen clearly in FIG. 3. The encountered windshear is at a fixed magnitude of 5 knots/second and a fixed duration of 25 seconds. This combination of magnitude and duration is typical of actual windshear encounters. Line segment 30 represents the flight path of the aircraft before the tail windshear encounter at point 32. At point 32 the windshear begins and endures for 25 seconds therefrom. Line 34 represents the flight path for the present invention. Line 36 represents an optimal guidance system in which the accumulated measurement errors have caused an error of 2.5 degrees greater than the true inertial flight path angle. Line 38 represents the same system in which the accumulated errors have resulted in a flight path which is 2.5 degrees less than the true inertial flight path angle. It will be clearly seen that the present invention produces an optimum flight path capable of exiting the windshear without impacting the ground.

From the above discussion, it will be clear that the present invention's utilization of an accurate flight path angle derived from an inertial platform provides superior performance compared to a system using the measurements of vertical gyroscope pitch angle and angle of attack, which are prone to significantly larger errors.

The present invention may be implemented by using conventional analog circuitry and computational techniques or by using conventional wholly digital techniques or by using conventional hybrid digital/analog techniques. To simplify the understanding of the invention, it will be explained by using a generally analog format as shown in FIG. 4, it being understood that the same analog format may also represent, in block diagram form, the program of a programmable digital computer wherein the various analog inputs are converted to digital signals for digital processing and the various digital outputs are converted to analog signals for driving either a flight director indicator or automatic pilot system, or both.

The present invention is preferably implemented in conjunction with a windshear detection system, such as described in the assignee's U.S. Pat. No. 4,593,285 or pending application Ser. No. 835,446, now U.S. Pat. No. 4,728,951, which are incorporated herein by reference. Said U.S. Pat. No. 4,593,285 applies a plurality of signals derived from sensed horizontal and vertical inertial acceleration and air mass acceleration components to indicate incipient windshear at predetermined magnitudes of severity. Application Ser. No. 835,446, now U.S. Pat. No. 4,728,951 makes use of a combination of airspeed, flight path angle, and vertical acceleration to provide signals representative of the presence of vertical windshear. These windshear detection systems are capable of supplying a logic signal indicating whether or not a serious windshear condition, either horizontal or vertical winds, has been detected. The present invention may also utilize an angle of attack computer such as described in the assignee's U.S. Pat. No. 3,791,208, which provides a measure of the true angle of attack and true flight path angle derived from redundant measurements of inertial and air data, to substitute for the inertial reference system.

Figure 4:
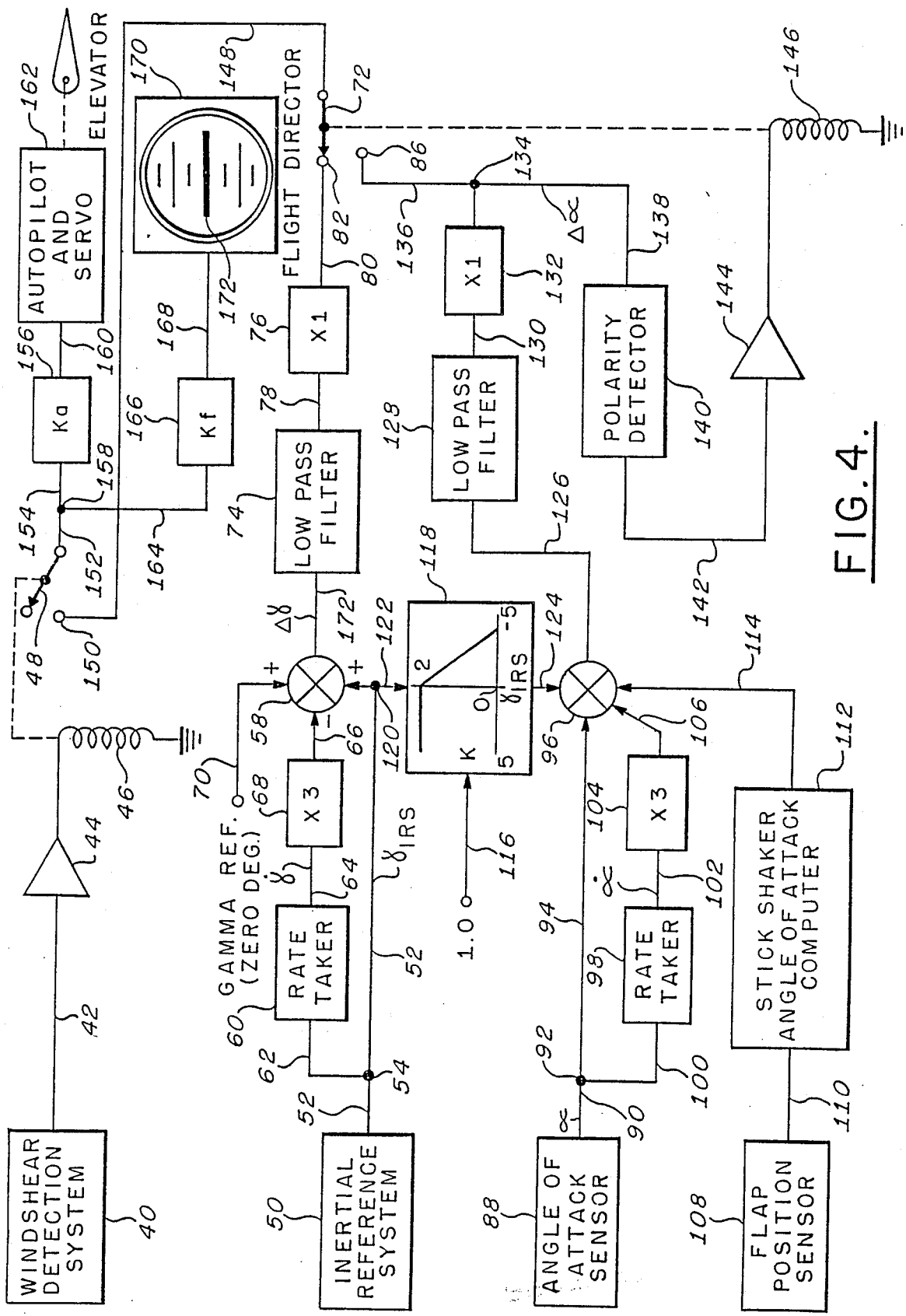
FIG. 4 is a schematic block diagram of the invention showing its detailed organization.

Referring now to FIG. 4, when a serious windshear condition has been detected, Windshear Detection System 40 supplies a logical 1 on lead 42, otherwise the signal on lead 42 is a logical 0. Lead 42 supplies conventional amplifier 44 which amplifies the signal so that the output voltage may activate conventional relay 46. Relay 46 controls switch arm 48 in a well-known manner. Hence, a logical 1 on lead 42 will result in relay 46 being activated and thus switch arm 48 will make contact with switch terminal 150.

Simultaneously, Inertial Reference System 50 outputs inertial flight path angle $\gamma_{IRS}$ on lead 52 and hence to junction 54. Junction 54 supplies lead 56 and conventional summation device 58. Junction 54 also supplies conventional rate taker 60 via lead 62. Conventional rate taker 60 acts in such a manner as to supply the first derivative with respect to time of the signal on lead 62 to lead 64. Consequently, the signal on lead 64 represents the rate of change of the inertial flight path angle, indicated as $\dot\gamma$. Lead 64 supplies conventional gain block 68 so that the output on lead 66 is the signal on lead 64 multiplied by a predetermined value, as for example 3. Lead 66 supplies conventional summation device 58.

The signal on lead 70, which represents a predetermined inertial gamma command of zero degrees, also supplies conventional summation device 58. Summation device 58 operates in such a way as to supply the inertial gamma command 70 minus the actual inertial gamma, lead 56, minus the rate of change of the actual gamma 64 times a constant gain 68 to lead 72, denoted as $\Delta\gamma$. Lead 72 supplies conventional low pass filter 74, whose function is to attenuate high frequency signals while passing lower frequency signals without modification. It is used therefore to filter out any high frequency noise that may be present on lead 72. Low pass filter 74 has a transfer function of the form $1/(TS+1)$ where the time constant T has a value of about 3 seconds. Low pass filter 74 supplies conventional gain block 76 via lead 78. Gain block 76 operates in such a manner as to multiply the signal appearing on lead 78 by a predetermined constant, as for example 1.0. The output of gain block 76 appears on lead 80 and thence to switch contact 82. The signal on switch contact 82 therefore represents the difference between the inertial flight path angle command and the actual inertial flight path angle of the aircraft including the rate of change of the latter. It therefore constitutes an error command signal to be processed by the automatic pilot system and/or flight director system in a manner yet to be described.

Angle of attack sensor 88 supplies a signal representative of the actual angle of attack of the aircraft measured in degrees, on lead 90 and thence to junction 92, lead 94, and conventional summation device 96. Simultaneously, the angle of attack signal is supplied to conventional rate taker 98 via junction 92 and lead 100. Rate taker 98 acts in such a manner as to output the first derivative with respect to time of the angle of attack signal on lead 102 and thence to conventional gain block 104. Hence the signal on lead 102 represents the time rate of change of angle of attack $\alpha$. Gain block 104 multiplies the signal on lead 102 by a predetermined constant, for example 3, and outputs the result on lead 106 and thence to summation device 96.

Flap position sensor 108 outputs a signal representative of the actual flap position of the aircraft on lead 110 and thence to stick shaker angle of attack computer 112.

Stick shaker angle of attack computer 112 outputs a signal representative of the stick shaker angle of attack corresponding to the actual flap position on lead 114 and thence to summation device 96.

A predetermined constant, for example 1.0, appears on lead 116 and thence to variable gain block 118. Simultaneously, a signal representative of the actual inertial flight path angle is supplied to variable gain block 118 via junction 120 and lead 122. Variable gain block 118 operates in the manner illustrated on the face of the block: a value of K is computed as a function of actual inertial flight path angle $\gamma_{IRS}$ according to the equation:

$$K = 2 - 0.4\gamma_{IRS}$$

and the value of K is restricted between a value of 2 and 0. The value of K is multiplied by the signal on lead 116 and thence output on lead 124 to summation device 96. By this action, the signal on lead 124 would be 2 for inertial flight path angles greater than or equal to zero; for inertial flight path angles less than zero, the value on lead 124 would be 1 times the value of K. If the inertial flight path angle should be $-5$ degrees or less, the signal on lead 124 would be zero. The signal on lead 124 is eventually subtracted from the computed value of stick shaker angle of attack at summing junction 96. Consequently, the maximum allowed angle of attack will be a function of the inertial flight path angle $\gamma_{IRS}$. For inertial flight path angles greater than or equal to zero, the maximum allowed angle of attack will be stick shaker angle of attack minus two degrees. Should the aircraft begin to descend (thus producing a negative inertial flight path angle) the allowable angle of attack will increase since the value on lead 124 will decrease. If the inertial flight path angle should be $-5$ degrees or less, the maximum angle of attack allowed would be stick shaker angle of attack. By this action, the aircraft is prevented from flying at stick shaker angle of attack unless the inertial flight path angle is negative. Once the inertial flight path angle becomes negative, it is prudent to allow increases in allowable angle of attack to generate more lift to preclude striking the ground.

Summation device 96 operates in such a manner as to output on lead 126 the computed stick shaker angle of attack 114 minus the actual angle of attack $\alpha$ minus the time rate of change of actual angle of attack $\alpha$. Lead 126 supplies conventional low pass filter 128 which operates in an identical manner as low pass filter 74 described previously.

The output of low pass filter 128 appears on lead 130 which supplies conventional gain block 132. Gain block 132 multiplies the value of the signal on lead 130 by a predetermined value, as for example 1.0, and outputs the result, $\Delta\alpha$, to junction 134. One lead from junction 134, lead 136, supplies a signal to switch contact 86. The other lead, 138, supplies polarity detector 140. Polarity detector 140 will produce a logical 1 on lead 142 if the value on lead 138 is less than zero; otherwise it will produce a logical 0 on lead 142. Lead 142 supplies conventional amplifier 144 which will output a voltage to conventional relay 146 if a logical 1 appears on lead 142, otherwise amplifier 144 outputs zero volts and relay 146 is not energized. Relay 146 controls switch arm 72 and thereby controls the signal on lead 148.

By the action described in the preceding paragraph, it will be clear that the signal appearing on lead 148 will be the signal appearing on switch contact 82 provided that the signal at junction 134 is zero or positive; that is, if $\Delta\alpha$ is zero or positive indicating that the aircraft is flying at or below the maximum allowable angle of attack. The signal on lead 148 will be that on switch contact 86 if the signal at junction 134 is negative; that is, if the aircraft is flying above the maximum allowable angle of attack.

Lead 148 supplies switch contact 150. Switch arm 48 will connect with switch contact 150 in the event a serious windshear has been detected as described previously. Switch arm 48 supplies lead 152.

Lead 152 supplies conventional gain block 156 via junction 158 and lead 159. Gain block 156 multiplies the signal on lead 154 by an appropriate constant gain that is determined by the characteristics of the autopilot system. The output of gain block 156 appears on lead 160 and thence to conventional autopilot system and elevator servo 162. In the conventional manner, a command signal to the elevator control surface is generated. The elevator control surface will cause either an increase or decrease in angle of attack and pitch angle until, through the well-known principle of feed-back control systems, the signal on lead 152 is null. When the signal on lead 152 is null, the guidance control has been satisfied and the aircraft is on the correct flight path.

In a similar fashion, a signal is supplied to the flight director system through lead 152, junction 158, and lead 164. Lead 164 supplies conventional gain block 166. Conventional gain block 166 multiplies the signal on lead 164 by an appropriate amount that is dependent on the characteristics of the flight director system. The output of gain block 166 appears on lead 168 and thence to conventional flight director system 170. The signal on lead 168 drives, through conventional electronic or mechanical means, the conventional pitch command bar, 172. The human pilot, seeing the movement of the pitch command bar will change the angle of attack and pitch angle of the aircraft in the direction indicated by the command bar movement until, through the well-known principle of feed-back control systems, the signal on lead 152 is null. When the signal on lead 152 is null the guidance control has been satisfied and the aircraft is on the correct flight path.

It will be appreciated from the foregoing discussion that in a windshear encounter, a fixed predetermined inertial flight path angle is commanded for a windshear which may consist of horizontal windshear or vertical windshear or both. An error command is produced by subtracting the actual inertial flight path angle and its time derivative multiplied by a constant gain from the commanded flight path angle of zero degree. In the event that the actual angle of attack of the aircraft exceeds the computed maximum allowable angle of attack, a direct command equal to the difference between the maximum allowable angle of attack minus the actual angle of attack and its time derivative multiplied by a constant is used to command a reduction in angle of attack until the actual angle of attack is equal to or less than maximum allowable angle of attack. In the case where the aircraft has positive or zero inertial flight path angle, the maximum allowable angle of attack is the stick shaker angle of attack minus 2 degrees. If the aircraft has a negative inertial flight path angle, the maximum allowable angle of attack will increase until, when the inertial flight path angle is −5 degrees or less, the maximum allowable angle of attack will be stick shaker angle of attack. The combination of the above-mentioned functions serves to produce a guidance command that results in the optimal flight path angle with minimal system errors while providing protection against stalling the aircraft by limiting the maximum allowable angle of attack.

It may further clarify the action of the present invention by considering its operation in a typical windshear encounter. Assume the aircraft has just left the ground and has an inertial flight path angle of 6 degrees when it encounters a windshear. Upon detection of the windshear by the windshear detection system, command signals generated by the present invention will flow to the aircraft's automatic pilot and flight director systems. As the actual angle of attack of the aircraft will initially be substantially below the computed maximum allowable of stick shaker angle of attack minus two degrees, the command to the automatic pilot and flight director systems will be a flight path angle command such as to result in an inertial flight path angle of zero degrees. If the windshear is sustained, the aircraft will lose speed and thus its angle of attack must increase to generate sufficient lift to maintain zero inertial flight path angle. As the angle of attack exceeds the maximum allowable, control will switch over (through switch arm 72) to angle of attack control wherein commands are generated to maintain the maximum allowable angle of attack. As the inertial flight path angle decreases (since no more lift can be generated through higher angles of attack to maintain zero inertial flight path angle), the maximum allowable angle of attack will increase, permitting the aircraft to generate more lift by increasing its angle of attack. Finally, should the aircraft's inertial flight path angle become equal to or less than −5 degrees, the maximum angle of attack will be stick shaker angle of attack, the maximum angle of attack that the aircraft may be safely flown.

While the invention has been described in its preferred embodiments, it is to be understood that the words which have been used are words of description rather than limitation and that changes may be made within the purview of the appended claims without departing from the true scope and spirit of the invention in its broader aspects.

Embodiments of the invention in which an exclusive property or right is claimed are defined as follows:

1. An aircraft flight path angle control system including an inertial reference system, comprising:
   means responsive to said inertial reference system for sensing an inertial flight path angle for the aircraft and producing a signal representative thereof;
   means for providing a signal representative of a predetermined flight angle,
   means responsive to said signals representative of an inertial flight path angle and a predetermined flight path angle for producing an algebraic difference thereof,
   means responsive to said difference for deriving an error signal,
   means for applying said error signal to said control system,
   means for providing a signal representative of stick shaker angle of attack,
   means for sensing the actual angle of attack of the aircraft and providing a signal representative thereof,
   means responsive to said signals representative of stick shaker angle of attack and actual angle of attack for forming an algebraic difference thereof,
   means for combining said error signal with said difference of stick shaker angle of attack and actual angle of attack to form a further difference thereof corresponding to a maximum safe angle of attack, and means for varying said error signal in accordance with a predetermined value of inertial angle of attack.

2. An aircraft flight control system as set forth in claim 1, further comprising means for varying said error signal in accordance with a fixed value of said inertial angle of attack.

3. An aircraft flight control system as set forth in claim 2, further comprising means for varying said error signal as a function of the diversion of said inertial angle of attack from said fixed value.

4. An aircraft control system as set forth in claim 3, further comprising means for varying said error signal as a continuous function of said inertial angle of attack.

5. An aircraft control system as set forth in claim 4, said means for varying said error signal further comprising limiter means responsive to values of said inertial flight path angle in excess of said predetermined value, said limiter means having an output that diminishes toward zero as said inertial flight path angle diminishes from said predetermined value.

6. An aircraft flight control system as set forth in claim 5, further comprising automatic pilot control means coupled to receive said error signal.

7. An aircraft flight control system as set forth in claim 6, further comprising flight director instrument means coupled to receive said error signal.

8. An aircraft flight control system as set forth in claim 7, further comprising windshear detection means for applying said error signal to at least one of said automatic pilot means or said flight director instrument means when values of a vertical or horizontal windshear in excess of a predetermined threshold in time and duration are exceeded.

9. An aircraft flight control system as set forth in claim 8, further comprising switch means for selectively applying said error signal or said output of said limiter means to at least one of said automatic pilot means or said flight director instrument means.

10. An aircraft flight control system as set forth in claim 9, further comprising logic means responsive to a predetermined magnitude and polarity of said output of said limiter means, for applying said error signal to at least one of said automatic pilot means or said flight director instrument means when said difference of signals representative of stick shaker angle of attack and actual angle of attack is of a positive polarity indicative of a safe flight angle and for applying said output signal of said limiter means to at least one of said automatic pilot means or said flight director instrument means when said difference of signals is of a zero value or of a negative polarity.

* * * * *